(12) United States Patent
Yokoyama

(10) Patent No.: US 9,339,962 B2
(45) Date of Patent: May 17, 2016

(54) SCREW POSITION ADJUSTING DEVICE FOR INJECTION MOLDING MACHINE

(71) Applicant: SODICK CO., LTD., Kanagawa (JP)

(72) Inventor: Koichi Yokoyama, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 0 days.

(21) Appl. No.: 14/767,581

(22) PCT Filed: Mar. 28, 2014

(86) PCT No.: PCT/JP2014/059378
§ 371 (c)(1),
(2) Date: Aug. 12, 2015

(87) PCT Pub. No.: WO2014/157711
PCT Pub. Date: Oct. 2, 2014

(65) Prior Publication Data
US 2016/0075065 A1     Mar. 17, 2016

(30) Foreign Application Priority Data

Mar. 28, 2013  (JP) ................................. 2013-068446

(51) Int. Cl.
*B29C 45/54*     (2006.01)
*B29C 45/50*     (2006.01)
(Continued)

(52) U.S. Cl.
CPC ............. *B29C 45/5008* (2013.01); *B29C 45/52* (2013.01); *B29C 45/54* (2013.01); *B29C 45/57* (2013.01); *B29C 2045/5052* (2013.01)

(58) Field of Classification Search
CPC .......... B29C 45/52; B29C 45/54; B29C 45/57
USPC ........................... 425/557, 558, 559, 560, 561
See application file for complete search history.

(56) References Cited

U.S. PATENT DOCUMENTS 5,858,420 A * 1/1999 Szajak .................. B29C 45/586
425/557
5,925,295 A * 7/1999 Nakamura .............. B29C 45/50
264/328.19

(Continued)

FOREIGN PATENT DOCUMENTS

JP     H04-38412     3/1992
JP     H05-037810    2/1993

(Continued)

OTHER PUBLICATIONS

"International Search Report (Form PCT/ISA/210)", mailed on Jul. 1, 2014, with English translation thereof, pp. 1-4, in which four of the listed references (JPH06-031783A, JPH04-38412U, JP2010-274589A and JP2000-065010A) were cited.

*Primary Examiner* — Tim Heitbrink
(74) *Attorney, Agent, or Firm* — Jianq Chyun IP Office

(57) ABSTRACT

A screw (20) for rotating within a material supply cylinder (22) to plasticize a material is able to reciprocate in the axial direction, between a retracted position away from a communicating passage (41) through which a plasticization chamber (23) leads to an injection chamber (33), and an advanced position at which the screw closes off the communicating passage. The screw position adjustment device includes: a thread (50) immovable with respect to the material supply cylinder, and having a through-hole (51) extending in the axial direction; a position adjustment nut (56) threadably engaged at the outside peripheral face of a thread for determining the retracted position; a fastener (58) for securing the position of the position adjustment nut; and a casing (72) covering the position adjustment nut and the fastener, and having an opening (73) for moving closer to the position adjustment nut and the fastener.

14 Claims, 6 Drawing Sheets

(51) Int. Cl.
*B29C 45/57* (2006.01)
*B29C 45/52* (2006.01)

(56) References Cited

U.S. PATENT DOCUMENTS

| | | | | |
|---|---|---|---|---|
| 6,017,210 | A * | 1/2000 | Takayama | B29C 45/57 264/328.1 |
| 6,200,127 | B1 * | 3/2001 | Klaus | B29C 45/52 425/557 |
| 7,377,769 | B2 * | 5/2008 | Chen | B29C 45/54 425/557 |
| 7,615,181 | B2 * | 11/2009 | Inukai | B29C 45/54 264/328.19 |

FOREIGN PATENT DOCUMENTS

| | | |
|---|---|---|
| JP | H06-020583 | 1/1994 |
| JP | H06-031783 | 2/1994 |
| JP | 2575574 | 1/1997 |
| JP | 2000-065010 | 3/2000 |
| JP | 2010-274589 | 12/2010 |
| JP | 4708094 | 6/2011 |

\* cited by examiner

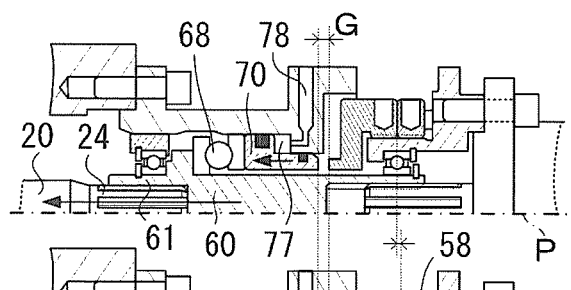
FIG. 6(a)
FIG. 6(b)
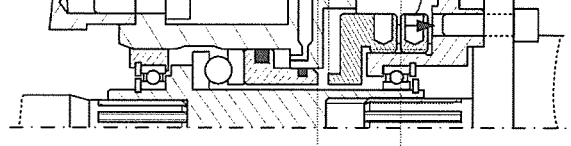
FIG. 6(c)
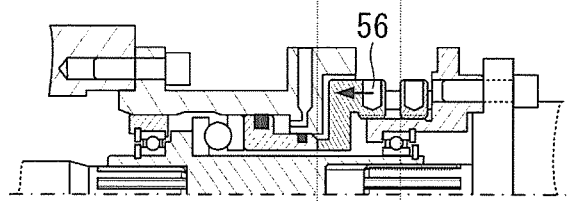
FIG. 6(d)
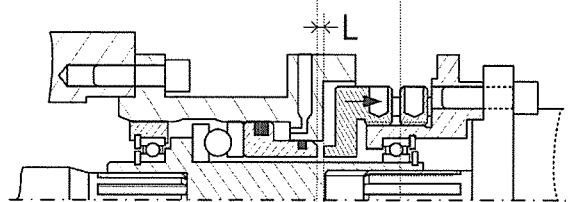
FIG. 6(e)
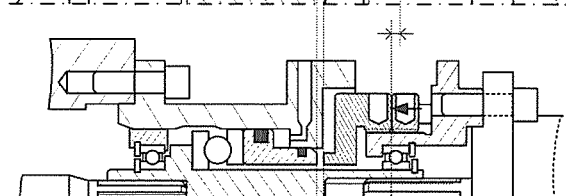
FIG. 6(f)
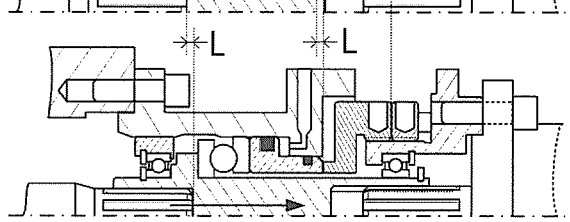

SCREW POSITION ADJUSTING DEVICE FOR INJECTION MOLDING MACHINE

CROSS-REFERENCE TO RELATED APPLICATION

This application is a 371 application of an international PCT application serial no. PCT/JP2014/059378, filed on Mar. 28, 2014, which claims the priority benefit of Japan application no. 2013-068446, filed on Mar. 28, 2013. The entirety of each of the above-mentioned patent applications is hereby incorporated by reference herein and made a part of this specification.

BACKGROUND OF THE INVENTION

1. Field of the Invention

The invention relates to an injection molding machine that achieves molding by injecting a material into a mold. In particular, the invention relates to a device for adjusting the position of a screw in the axial direction, which plasticizes or mixes the material.

2. Description of Related Art

Patent Literature 1 discloses an injection molding machine, which separately includes a screw for plasticizing resin and an injection shaft for injecting molten resin into a mold. In this injection molding machine, thermoplastic resin is plasticized by rotation of the screw in the plasticizing cylinder. By advancing a plunger that serves as the injection shaft in the injection cylinder, the molten resin is injected into the mold. A driving device of the screw includes a rotating device composed of an electric or hydraulic motor for rotating the screw. The driving device further includes a hydraulic actuator for reciprocating the screw in the axial direction thereof. The plasticizing cylinder has a plasticization chamber and the injection cylinder has an injection chamber. The plasticization chamber communicates with the injection chamber through a communicating passage. In the process of plasticizing the resin, the molten resin is fed into the injection cylinder through the communicating passage. Prior to the process of injecting the molten resin, the communicating passage is closed by the conical front face of the screw. Thus, the screw is able to reciprocate in the axial direction.

Patent Literature 2 discloses a liquid resin injection molding machine that separately includes a screw for mixing two types of materials and an injection shaft for injecting the mixed material into the mold. In the liquid resin injection molding machine, two types of liquid resins in a mixing cylinder are mixed by rotation of the screw. By advancing a plunger that serves as the injection shaft in the injection cylinder, the mixed liquid is injected into the mold. The mixing cylinder has a mixing chamber and the injection cylinder has an injection chamber. The mixing chamber communicates with the injection chamber through a communicating passage. To prevent the mixed liquid from flowing back to the mixing cylinder from the injection cylinder, the screw can be advanced in the axial direction to close the communicating passage with its conical front face. Hereinafter, the plasticizing cylinder and the mixing cylinder are collectively referred to as a material supply cylinder.

According to Patent Literatures 1 and 2, the screw that plasticizes or mixes the material reciprocates between a retracted position and an advanced position. The retracted position is a position where the screw is away from the communicating passage. The screw rotates in the retracted position to send the material into the injection cylinder. The advanced position is a position where the front face of the screw closes the communicating passage. When the screw advances to close the communicating passage, the molten resin before the screw flows into the injection cylinder. However, part of the molten resin before the screw may flow backward and does not enter the injection cylinder. The amount of the resin that flows back may vary depending on the viscosity of the molten resin. As a result, there is a measuring error between the amount of the material that is actually fed into the injection cylinder from the material supply cylinder and a set value. As the distance between the retracted position and the advanced position increases, the measuring error also increases. For this reason, it is preferable to reduce the distance between the retracted position and the advanced position.

Patent Literature 3 discloses a screw position adjusting device that includes a connecting shaft coupled to the rear end of the screw. The connecting shaft connects the screw with the screw rotating device. The screw is movable in the axial direction but non-rotatable with respect to the connecting shaft. The connecting shaft has a hole through which an adjustment rod penetrates the connecting shaft coaxially. A female thread portion is formed on the inner peripheral surface of the hole while a male thread portion is formed on the outer peripheral surface of the adjustment rod. The adjustment rod is screwed to the connecting shaft. A fastener for preventing loosening of the adjustment rod is provided at the rear end of the adjustment rod. The front end of the adjustment rod is in contact with the rear end of the screw. The retracted position of the screw is adjustable through rotation of the adjustment rod.

Patent Literature 4 discloses another screw position adjusting device. The rear end portion of the screw is spline-coupled to a piston member, and the piston member is fitted to a cylinder member. The cylinder member is fixed to the screw rotating device. A first flange is formed on the plasticizing cylinder, and a second flange is formed on the cylinder member. A ring member is screwed to the outer periphery of one of the first flange and the second flange. A gap between the first and second flanges is adjustable through rotation of the ring member. The gap between the first and second flanges determines the retracted position of the screw. The second flange is fastened to the first flange by a bolt.

PRIOR ART LITERATURE

Patent Literature

Patent Literature 1: Japanese Patent Publication No. H05-037810.
Patent Literature 2: Japanese Patent No. 4708094.
Patent Literature 3: Japanese Utility Model Publication No. H06-020583.
Patent Literature 4: Japanese Patent No. 2575574.

SUMMARY OF THE INVENTION

Problem to be Solved

In Patent Literature 3, it is necessary to detach the screw rotating device in order to rotate the adjustment rod. In Patent Literature 4, it is necessary to advance or retract the whole screw rotating device in order to rotate the ring member.

The invention facilitates the process of adjusting the retracted position of the screw in the injection molding machine. Moreover, the invention reduces the time required for the process of adjusting the retracted position of the screw. Furthermore, the invention improves the accuracy of the process of adjusting the retracted position of the screw. Some other objectives or advantages of the invention are explained in the following paragraphs.

Solution to the Problem

The invention relates to a screw position adjusting device (5) for an injection molding machine that includes a material supply cylinder (22) having a first chamber (23), an injection cylinder (32) having a second chamber (33), a connection part (4) having a communicating passage (41) that communicates the first chamber with the second chamber, a screw (20) rotating in the material supply cylinder and plasticizing or mixing a material in a retracted position that is away from the communicating passage, an injection shaft (30) injecting the material in the injection cylinder, a rotating device (28) rotating the screw, and a reciprocating device (7) reciprocating the screw in an axial direction between an advanced position where the screw contacts the connection part to close the communicating passage and the retracted position, and the screw position adjusting device adjusts the retracted position in the injection molding machine. The screw position adjusting device includes: a thread (50) having a through-hole (51) that extends in the axial direction and being immovable with respect to the material supply cylinder; a position adjustment nut (56) screwed to an outer peripheral surface of the thread for determining the retracted position; a fastener (58) fixing a position of the position adjustment nut; and a casing (72) having an opening (73) for access to the position adjustment nut and the fastener and covering the position adjustment nut and the fastener.

The thread may be disposed coaxially with respect to the screw. Preferably, the rotating device includes a rotating shaft (27) that passes through the through-hole in a rotatable manner. The screw position adjusting device further includes a connecting shaft (60) to which the screw is spline-coupled, wherein the connecting shaft is spline-coupled to the rotating shaft.

Preferably, the thread includes a flange that is fixed to the casing or the material supply cylinder. The fastener may be a locknut screwed to the thread.

Preferably, the reciprocating device includes a cylinder member (72) and a piston member (70) that slides in the cylinder member in the axial direction, and the piston member is in contact with the position adjustment nut when the screw is in the retracted position.

BRIEF DESCRIPTION OF THE DRAWINGS

FIG. 6(a) to FIG. 6(f) are cross-sectional views showing an operation of the screw position adjusting device of the invention.

DESCRIPTION OF THE EMBODIMENTS

Figure 1:
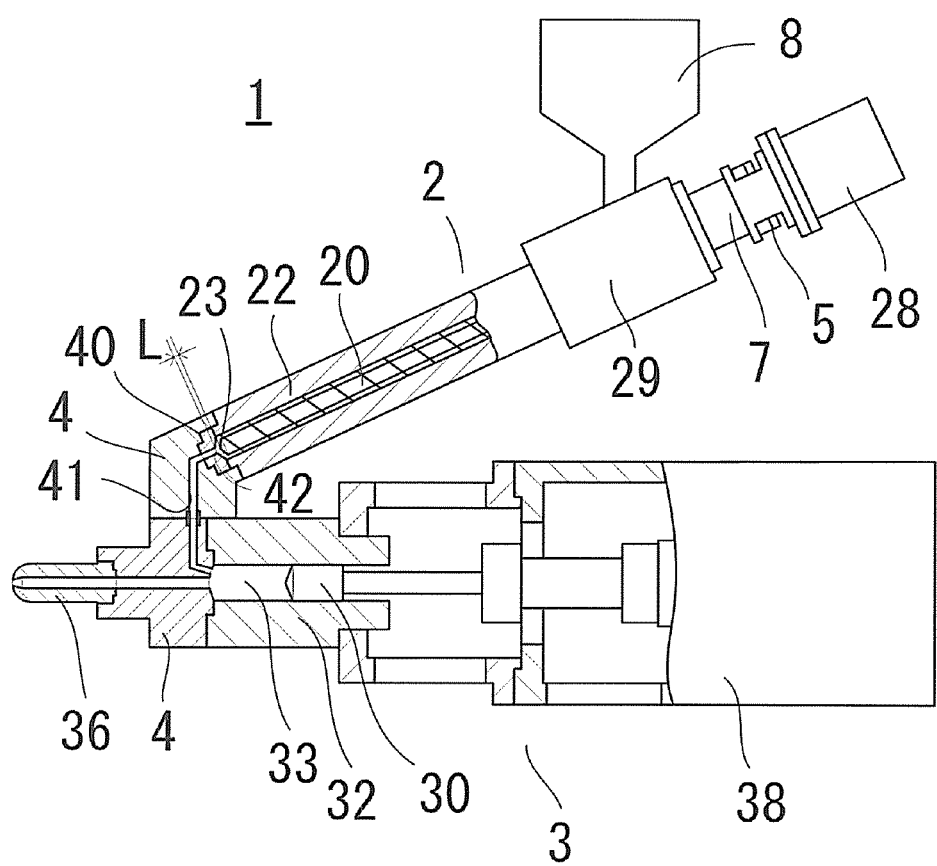
FIG. 1 is a cross-sectional view showing the injection molding machine using the screw position adjusting device of the invention.

An example of an injection molding machine that uses a screw position adjusting device of the invention is described with reference to FIG. 1. The injection molding machine 1 includes a plasticizing part 2, an injection part 3, and a connection part 4 connecting the plasticizing part 2 and the injection part 3. The plasticizing part 2 includes a plasticizing cylinder 22 that serves as a material supply cylinder, a screw 20, a reciprocating device 7, and a rotating device 28. The plasticizing cylinder 22 has a housing 29 integrally, and a hopper 8 may be attached to the housing 29. The screw 20 is rotatable in the plasticizing cylinder 22 and is movable in the axial direction.

The reciprocating device 7 is fixed to the rear end of the plasticizing cylinder 22 for reciprocating the screw 20 in the axial direction. The axial direction is a direction along a central axis P of the screw 20. The rotating device 28 is fixed to the rear end of the reciprocating device 7 for rotating the screw 20. A plasticization chamber 23 is formed by the front end of the screw 20, the plasticizing cylinder 22, and the connection part 4.

The injection part 3 includes a plunger 30 that serves as an injection shaft, an injection cylinder 32, an injection nozzle 36, and a plunger driving device 38. The plunger 30 is movable in the axial direction within the injection cylinder 32. The injection shaft is not limited to the plunger 30. The injection shaft may be any component that reciprocates in the injection cylinder 32 to inject a material in an injection chamber 33 into a mold through the injection nozzle 36. The injection shaft may be a screw with a chuck ring at the front end portion. The injection nozzle 36 is fixed to the front end of the injection cylinder 32 by the connection part 4. The plunger driving device 38 is provided for moving the plunger 30 in the axial direction.

The injection chamber 33 is formed by the front face of the plunger 30, the injection cylinder 32, and the connection part 4. A communicating passage 41 for communicating the plasticization chamber 23 with the injection chamber 33 is formed in the connection part 4. The connection part 4 includes a bush 40. The bush 40 is formed with a recess to be fitted to a conical front face of the screw 20. An opening 42 of the communicating passage 41 is formed in the recess. The screw 20 is movable between a retracted position away from the communicating passage 41, and an advanced position where the screw 20 contacts the connection part 4 and closes the communicating passage 41. Band heaters (not shown) for respectively heating the plasticizing cylinder 22, the connection part 4, the injection cylinder 32, and the injection nozzle 36 are attached to the outer periphery of these components.

In the injection molding machine 1, when the screw 20 is in the retracted position, a resin is introduced into the plasticizing cylinder 22 through the hopper 8. The resin is melted by rotation of the screw 20 and heating of the band heaters, and sent to the front of the screw 20. When a predetermined amount of the molten resin is fed into the injection chamber 33 through the communicating passage 41, the screw 20 is advanced by a distance L. Consequently, the conical front face of the screw 20 comes in contact with the bush 40 and closes the opening 42. When the screw 20 is in the advanced position, the molten resin in the injection chamber 33 is injected into the mold through the injection nozzle 36 due to advancement of the plunger 30.

Figure 2:
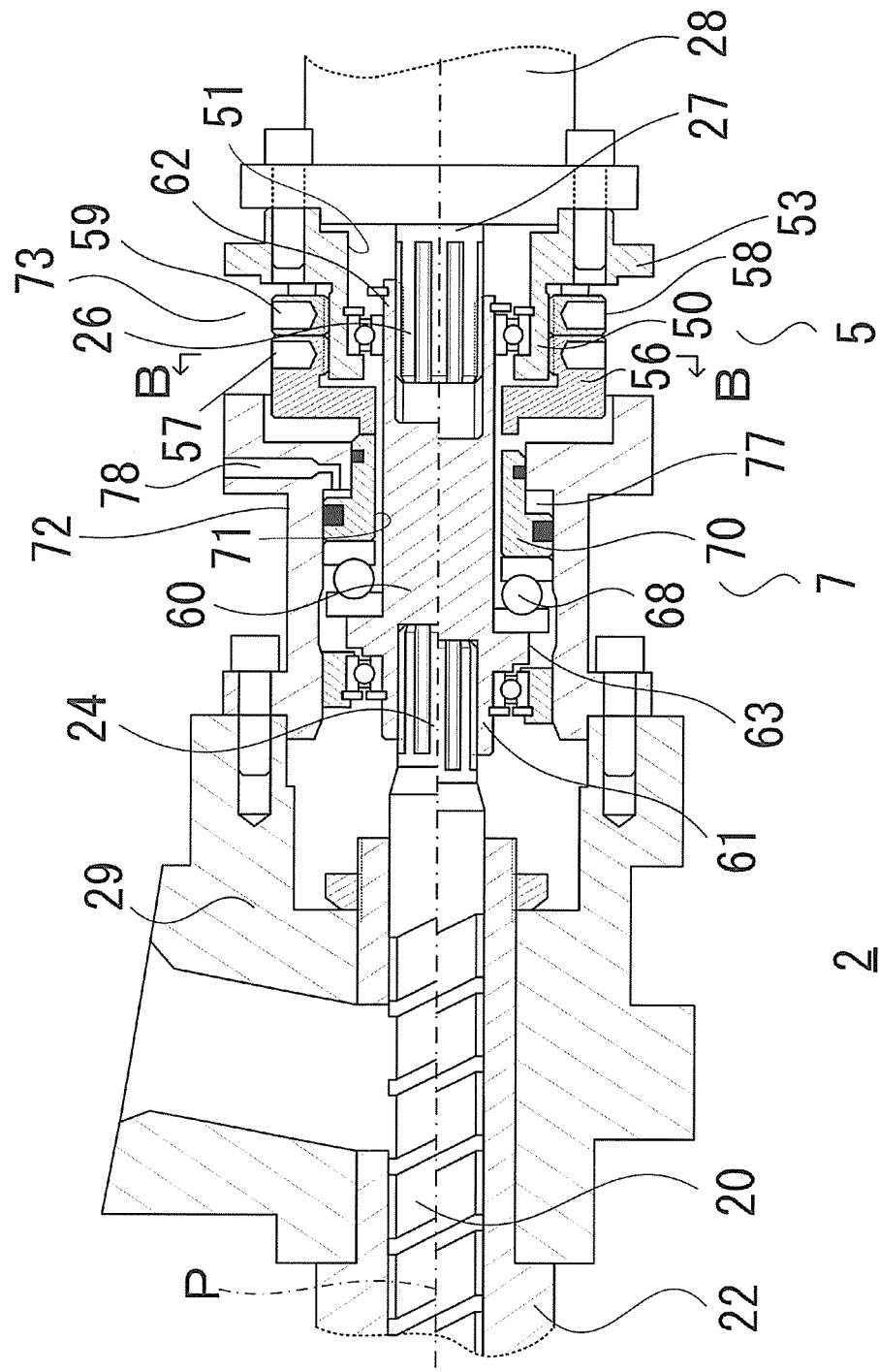
FIG. 2 is a cross-sectional view showing partially the plasticizing part of the injection molding machine when viewed along the line A-A of FIG. 3.
Figure 3:
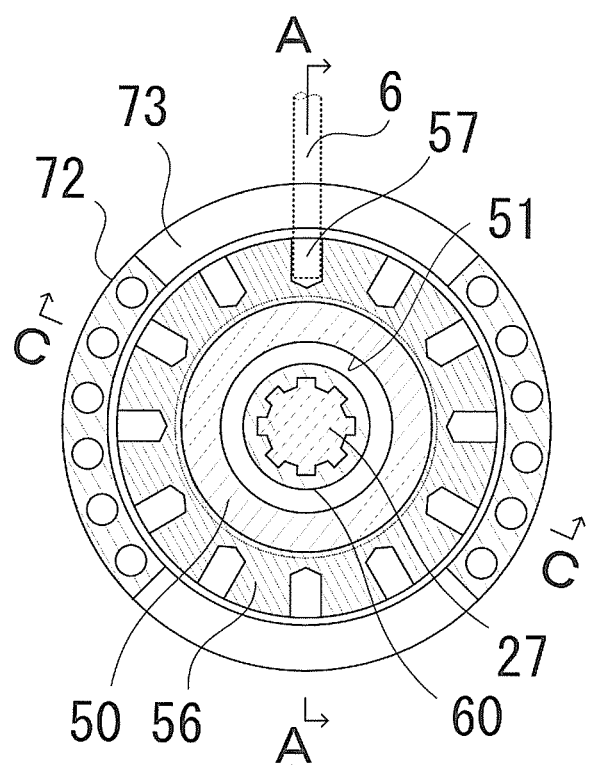
FIG. 3 is a cross-sectional view showing the screw position adjusting device of the invention when viewed along the line B-B of FIG. 2.
Figure 4:
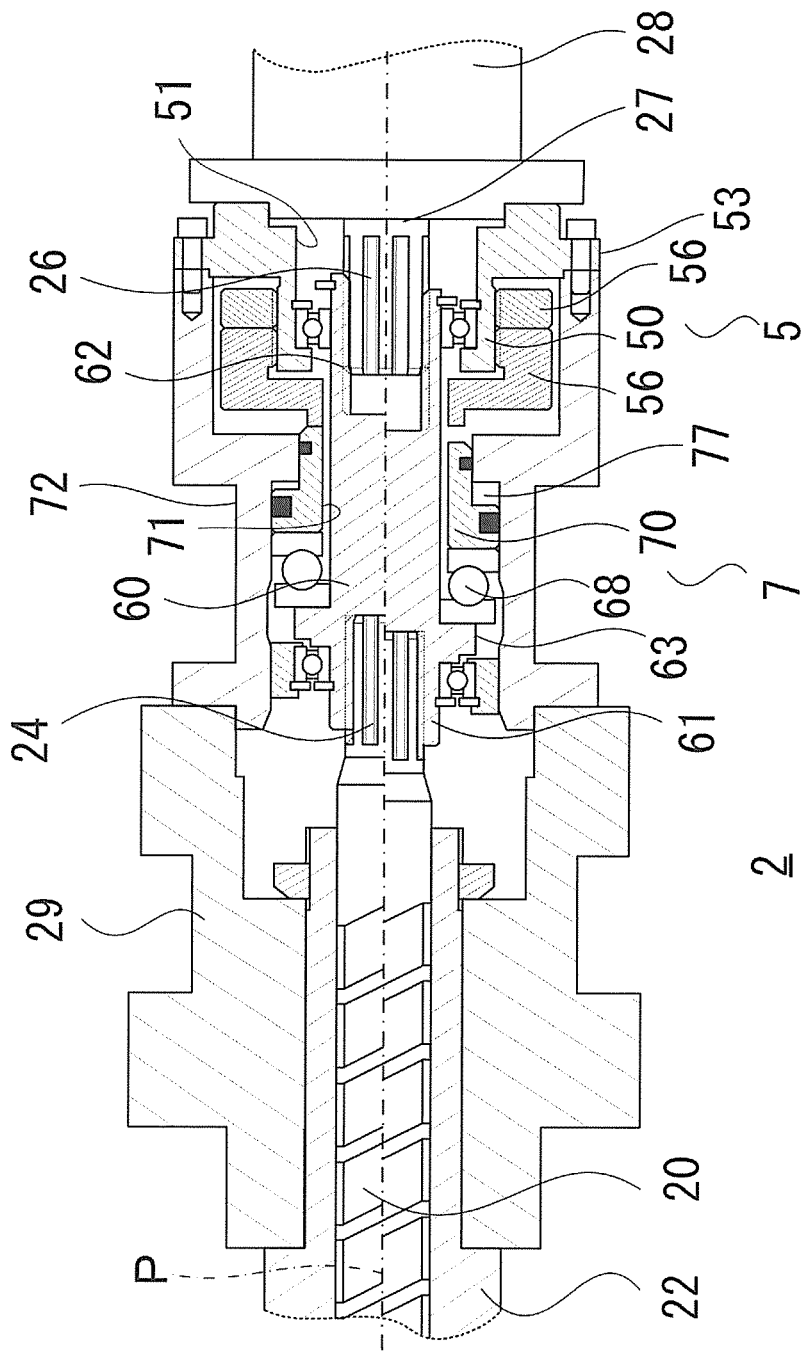
FIG. 4 is a cross-sectional view showing partially the plasticizing part of the injection molding machine when viewed along the line C-C of FIG. 3.

The plasticizing part 2 is described in detail with reference to FIG. 2, FIG. 3, FIG. 4, and FIG. 5. As shown in FIG. 2 and FIG. 4, the front end of a connecting shaft 60 is connected to the rear end of the screw 20. In the plasticizing part 2, the "front end" refers to one end close to the opening 42 while the "rear end" refers to the other end far away from the opening 42. In addition, "advance" means moving closer to the opening 42 while "retract" means moving away from the opening 42. The upper halves of FIG. 2 and FIG. 4 show the plasticizing part 2 when the screw 20 is in the retracted position. The lower halves of FIG. 2 and FIG. 4 show the plasticizing part 2 when the screw 20 is in the advanced position.

The connecting shaft 60 connects the screw 20 with the rotating device 28. The connecting shaft 60 transmits a torque of a rotating shaft 27 of the rotating device 28 to the screw 20. The screw 20 is spline-coupled to the connecting shaft 60, so as not to rotate with respect to the connecting shaft 60. As shown in FIG. 2 and FIG. 4, a spline shaft 24 is formed on the rear end of the screw 20. A cylinder 61 is formed on the front end of the connecting shaft 60, and a plurality of splines are formed on the inner peripheral surface of the cylinder 61. The spline shaft 24 is fitted to the cylinder 61.

The screw 20 is movable with respect to the connecting shaft 60 in the axial direction. Therefore, the screw 20 may be retracted by a reaction force of the resin fed toward the front end of the screw 20. With such spline coupling, the screw 20 may be easily pulled out of the connecting shaft 60. Hence, it is easy to replace the screw 20.

It is also possible to make the screw 20 non-rotatable and immovable in the axial direction with respect to the connecting shaft 60. In addition, the screw 20 and the connecting shaft 60 may be formed integrally.

The rear end of the connecting shaft 60 is spline-coupled to the rotating shaft 27 of the rotating device 28. It is also possible to make the connecting shaft 60 non-rotatable but movable in the axial direction with respect to the rotating shaft 27. A cylinder 62 is formed on the rear end of the connecting shaft 60, and a plurality of splines are formed on the inner peripheral surface of the cylinder 62. A spline shaft 26 is formed on the front end of the rotating shaft 27. The spline shaft 26 is fitted to the cylinder 62.

The connecting shaft 60 connects the screw 20 with the reciprocating device 7. A flange part 63 is formed on the outer peripheral surface of the connecting shaft 60. The connecting shaft 60 transmits a driving force of a moving member 70 of the reciprocating device 7 in the axial direction to the flange part 63 through a thrust bearing 68. The thrust bearing 68 receives the force applied in the axial direction of the rotating body. The thrust bearing 68 is a thrust ball bearing or a thrust roller bearing, for example.

The reciprocating device 7 for moving the screw 20 in the axial direction may be a hydraulic or pneumatic actuator that includes a cylinder member 72 and a piston member 70. The cylinder member 72 is fixed to the rear end of the plasticizing cylinder 22 by a bolt. The piston member 70 is an example of the moving member that slides in the cylinder member 72 in the axial direction. The cylinder member 72 is also a casing of the reciprocating device 7. An actuator for moving the piston member 70 toward the screw 20 may be any single-acting cylinder having a single oil chamber 77. Alternatively, the actuator may be a double-acting cylinder.

The piston member 70 has an inner hole 71 through which the connecting shaft 60 passes in a rotatable manner. The front end of the piston member 70 is connected to the flange part 63 of the connecting shaft 60 through the thrust bearing 68. Thus, the piston member 70 moves the connecting shaft 60 at least in the direction of the screw 20 without being affected by the torque of the connecting shaft 60. The reciprocating device 7 is not limited to the actuator composed of the cylinder member 72 and the piston member 70. The reciprocating device 7 may be any other device that makes the moving member reciprocate in the axial direction of the connecting shaft 60.

The rotating device 28 for rotating the screw 20 is fixed to the rear end of the casing 72. The rotating device 28 includes an electric motor or a hydraulic motor. The rotating device 28 includes the rotating shaft 27 connected to the connecting shaft 60. The rotating shaft 27 is non-rotatable but movable in the axial direction with respect to the connecting shaft 60. Therefore, the torque of the rotating shaft 27 is transmitted to the screw 20 by the connecting shaft 60. Since the rotating shaft 27 is spline-coupled to the connecting shaft 60, movement of the connecting shaft 60 in the axial direction is not transmitted to the rotating shaft 27.

A screw position adjusting device 5 of the invention includes a hollow thread 50, a position adjustment nut 56, and a locknut 58. The position adjustment nut 56 is screwed to the outer peripheral surface of the thread 50. The locknut 58 is firmly screwed to the outer peripheral surface of the thread 50. The locknut 58 is a fastener for preventing loosening of the position adjustment nut 56 and fixing the position of the position adjustment nut 56. The fastener is not limited to the locknut 58.

The thread 50 has a through-hole 51 through which the rotating shaft 27 passes in a rotatable manner. The through-hole 51 extends in the axial direction of the screw 20. A flange 53 is formed on the rear end of the thread 50. The thread 50 is disposed to be immovable with respect to the plasticizing cylinder 22. The flange 53 of the thread 50 is fixed to the casing 72 of the reciprocating device 7. It is also possible to fix the flange 53 to the rear end of the plasticizing cylinder 22. A part of the thread 50 or the whole thread 50 may be accommodated inside the casing 72.

As illustrated by the upper halves of FIG. 2 and FIG. 4, with the piston member 70 being in contact with the position adjustment nut 56, the screw 20 is restricted from retracting beyond the predetermined retracted position. By rotating the position adjustment nut 56 in a state where the position adjustment nut 56 remains screwed to the thread 50, the position adjustment nut 56 is moved in the axial direction of the screw 20. Accordingly, the retracted position of the screw 20 may be adjusted by rotation of the position adjustment nut 56.

According to the rotation angle, the number of rotations, and the rotation direction of the position adjustment nut 56, the distance by which the position adjustment nut 56 advances or retracts in the axial direction with respect to the thread 50 may be calculated based on the dimensions of the thread and the nut. For example, if the position adjustment nut 56 advances 1 mm by one rotation in a certain direction, the position adjustment nut 56 may be rotated 180 degrees in the reverse direction to be retracted 0.5 mm. As shown in FIG. 2 and FIG. 3, an opening 73 is formed in the casing 72 of the reciprocating device 7 for easy access to the position adjustment nut 56 and the locknut 58. The operator may operate the position adjustment nut 56 and the locknut 58 through the opening 73.

Figure 5:
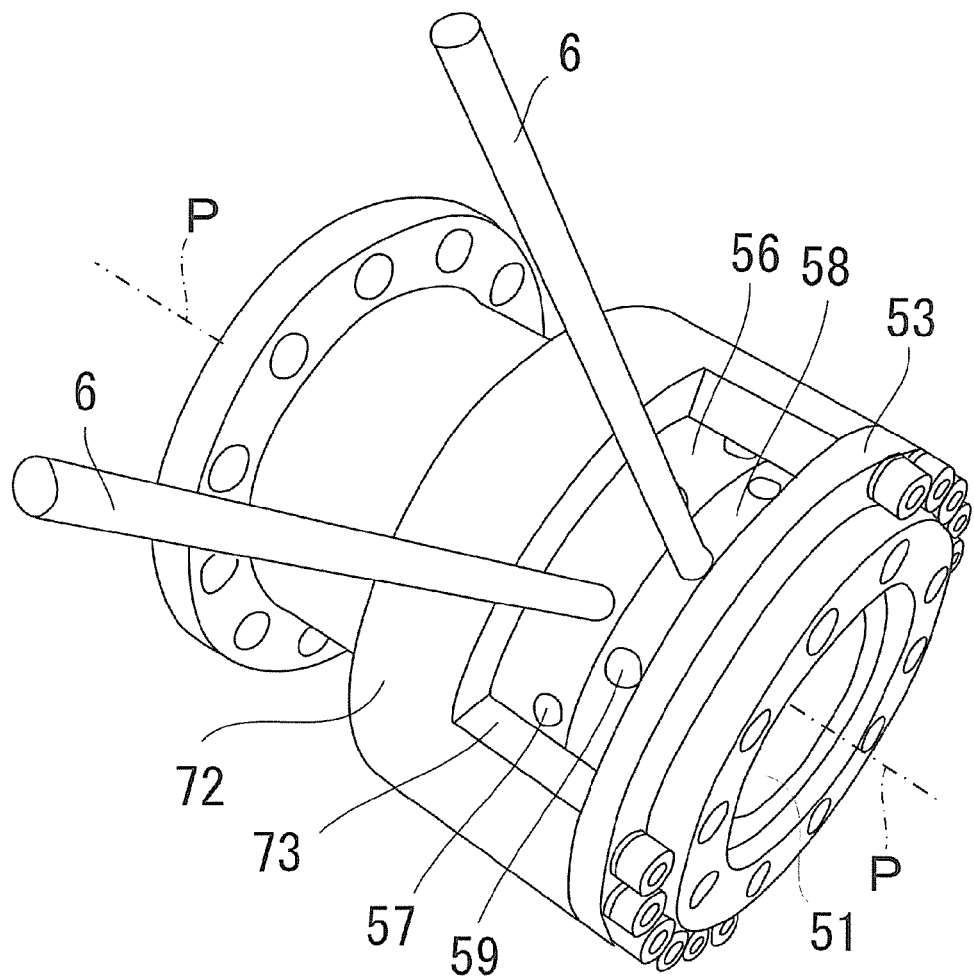
FIG. 5 is a perspective view showing the screw position adjusting device of the invention.

As shown in FIG. 3 and FIG. 5, a plurality of insertion holes 57 are formed on the outer peripheral surface of the position adjustment nut 56 at equal intervals in the circumferential direction. It is possible to form at least one insertion hole 57. The front end portion of a rod 6 may be fitted into the insertion hole 57. The operator may use the rod 6 to rotate the position adjustment nut 56. A scale indicating the position or distance in the axial direction may be disposed on the outer peripheral surface of the position adjustment nut 56 or the cylinder member 72. In order to determine the retracted position of the screw 20, the position adjustment nut 56 may be in contact with the connecting shaft 60 or the screw 20, not limited to the piston member 70, through the thrust bearing.

The locknut 58 is screwed to the outer peripheral surface of the thread 50 to fix the retracted position of the screw 20. As shown in FIG. 5, a plurality of insertion holes 59 are formed on the outer peripheral surface of the locknut 58 at equal intervals in the circumferential direction. It is possible to form at least one insertion hole 59. The front end portion of the rod 6 may be fitted into the insertion hole 59. The operator may use the rod 6 to rotate the locknut 58. To make the plasticizing part 2 compact, the connecting shaft 60, the thrust bearing 68, the piston member 70, the position adjustment nut 56, the locknut 58, the thread 50, and the rotating shaft 27 are arranged coaxially with the screw 20.

An operation of the screw position adjusting device 5 for adjusting the retracted position of the screw 20 is explained below with reference to FIG. 6(*a*) to FIG. 6(*f*). As shown in FIG. 6(*a*), hydraulic oil from a hydraulic pump is supplied to the oil chamber 77 through a pipe 78 to advance the piston member 70. Consequently, a gap G is formed between the piston member 70 and the position adjustment nut 56. The piston member 70 advances the connecting shaft 60 through the thrust bearing 68 to bring the bottom of the cylinder 61 of the connecting shaft 60 in contact with the spline shaft 24 of the screw 20. In this way, the screw 20 is moved to the advanced position where the front face of the screw 20 closes the opening 42 of the communicating passage 41.

Next, as shown in FIG. 6(*b*), the locknut 58 is loosened to allow the position adjustment nut 56 to rotate. As shown in FIG. 6(*c*), by rotating the position adjustment nut 56, the position adjustment nut 56 is advanced until the position adjustment nut 56 comes in contact with the piston member 70. As shown in FIG. 6(*d*), the position adjustment nut 56 is retracted by the distance L. The distance L is equivalent to a desired distance between the opening 42 and the front face of the screw 20. As shown in FIG. 6(*e*), the locknut 58 is rotated in the direction to tighten the position adjustment nut 56 so as to fix the position of the position adjustment nut 56. In this way, as shown in FIG. 6(*f*), the screw 20 may reciprocate with the gap G between the piston member 70 and the position adjustment nut 56 being the distance L.

In a process of plasticizing the resin in the plasticizing part 2, the screw 20 is rotated while the oil chamber 77 is opened, and the resin is sent to the front face of the screw 20. The screw 20 is retracted by the reaction force of the molten resin until the piston member 70 comes in contact with the position adjustment nut 56. When the piston member 70 is in contact with the position adjustment nut 56, the screw 20 remains in the retracted position and rotates.

When the plasticizing process is finished, the hydraulic oil is supplied into the oil chamber 77 to advance the piston member 70 before an injection process begins. Consequently, the screw 20 is moved to the advanced position and closes the opening 42. In the process of injecting the molten resin into the mold, the screw 20 is pressed toward the bush 40 against the injection pressure, so as to prevent the molten resin from flowing back into the plasticizing cylinder 22 from the injection cylinder 32.

[Descriptions of Reference Numerals]

| | |
|---|---|
| 1 | injection molding machine |
| 2 | plasticizing part |
| 20 | screw |
| 22 | plasticizing cylinder |
| 23 | plasticization chamber |

[Descriptions of Reference Numerals]

| | |
|---|---|
| 24, 26 | spline shaft |
| 27 | rotating shaft |
| 28 | rotating device |
| 29 | housing |
| 3 | injection part |
| 30 | plunger |
| 32 | injection cylinder |
| 33 | injection chamber |
| 36 | injection nozzle |
| 38 | plunger driving device |
| 4 | connection part |
| 41 | communicating passage |
| 42 | opening |
| 40 | bush |
| 5 | screw position adjusting device |
| 50 | thread |
| 51 | through-hole |
| 53 | flange |
| 56 | position adjustment nut |
| 57, 59 | insertion hole |
| 58 | locknut |
| 6 | rod |
| 60 | connecting shaft |
| 61, 62 | cylinder |
| 63 | flange part |
| 68 | thrust bearing |
| 7 | reciprocating device |
| 70 | piston member |
| 71 | inner hole |
| 72 | cylinder member (casing) |
| 73 | opening |
| 77 | oil chamber |
| 78 | pipe |
| 8 | hopper |

What is claimed is:

1. A screw position adjusting device for an injection molding machine that comprises a material supply cylinder having a first chamber, an injection cylinder having a second chamber, a connection part having a communicating passage that communicates the first chamber with the second chamber, a screw rotating in the material supply cylinder and plasticizing or mixing a material in a retracted position that is away from the communicating passage, an injection shaft injecting the material in the injection cylinder, a rotating device rotating the screw, and a reciprocating device reciprocating the screw in an axial direction between an advanced position where the screw contacts the connection part to close the communicating passage and the retracted position, the screw position adjusting device adjusting the retracted position in the injection molding machine and comprising:

a thread having a through-hole that extends in the axial direction and being immovable with respect to the material supply cylinder;

a position adjustment nut screwed to an outer peripheral surface of the thread for determining the retracted position;

a fastener fixing a position of the position adjustment nut; and a casing having an opening for access to the position adjustment nut and the fastener and covering the position adjustment nut and the fastener.

2. The screw position adjusting device according to claim 1, wherein the thread is disposed coaxially with respect to the screw.

3. The screw position adjusting device according to claim 1, wherein the rotating device comprises a rotating shaft that passes through the through-hole in a rotatable manner.

4. The screw position adjusting device according to claim 3, further comprising a connecting shaft to which the screw is spline-coupled, wherein the connecting shaft is spline-coupled to the rotating shaft.

5. The screw position adjusting device according to claim 1, wherein the thread comprises a flange fixed to the casing.

6. The screw position adjusting device according to claim 1, wherein the thread comprises a flange fixed to the material supply cylinder.

7. The screw position adjusting device according to claim 1, wherein the fastener is a locknut screwed to the thread.

8. The screw position adjusting device according to claim 1, wherein the reciprocating device comprises a cylinder member and a piston member that slides in the cylinder member in the axial direction, and the piston member is in contact with the position adjustment nut when the screw is in the retracted position.

9. The screw position adjusting device according to claim 2, wherein the reciprocating device comprises a cylinder member and a piston member that slides in the cylinder member in the axial direction, and the piston member is in contact with the position adjustment nut when the screw is in the retracted position.

10. The screw position adjusting device according to claim 3, wherein the reciprocating device comprises a cylinder member and a piston member that slides in the cylinder member in the axial direction, and the piston member is in contact with the position adjustment nut when the screw is in the retracted position.

11. The screw position adjusting device according to claim 4, wherein the reciprocating device comprises a cylinder member and a piston member that slides in the cylinder member in the axial direction, and the piston member is in contact with the position adjustment nut when the screw is in the retracted position.

12. The screw position adjusting device according to claim 5, wherein the reciprocating device comprises a cylinder member and a piston member that slides in the cylinder member in the axial direction, and the piston member is in contact with the position adjustment nut when the screw is in the retracted position.

13. The screw position adjusting device according to claim 6, wherein the reciprocating device comprises a cylinder member and a piston member that slides in the cylinder member in the axial direction, and the piston member is in contact with the position adjustment nut when the screw is in the retracted position.

14. The screw position adjusting device according to claim 7, wherein the reciprocating device comprises a cylinder member and a piston member that slides in the cylinder member in the axial direction, and the piston member is in contact with the position adjustment nut when the screw is in the retracted position.

* * * * *